Patented Dec. 4, 1928.

1,694,040

UNITED STATES PATENT OFFICE.

ARTHUR BENNING RAY, OF BAYSIDE, ERNEST GARDNER DOYING, OF NEW YORK, N. Y., AND JOHN J. BUTKOVSKY, OF ELIZABETH, NEW JERSEY, ASSIGNORS TO CARBIDE AND CARBON CHEMICALS CORPORATION, A CORPORATION OF NEW YORK.

PROCESS OF MAKING ACTIVATED CARBON.

No Drawing.   Application filed October 22, 1925. Serial No. 64,271.

This invention relates to activated carbon of the gas and vapor absorptive type and to processes of making the same.

Activated carbon for absorption purposes, such for example as the extraction of gasoline from natural gas, or for solvent recovery or use in gas masks, is most advantageously prepared from the charred residue of very dense forms of cellulose, for example charcoal made from cocoanut or other nut shells, by subjecting such charcoal to the oxidizing action of superheated steam at very high temperatures. Thus in a process now in use, granular cocoanut charcoal is heated in externally fired furnaces, and superheated steam is injected through the carbon bed until the hydrocarbon constituents are substantially eliminated and the required porosity is attained. Active carbon has been made by impregnating sawdust or lignite with zinc chloride, drying and calcining, and leaching out the zinc compounds. The carbon as thus prepared is much less hard and dense, and to this extent is less suited for gas-absorption purposes, although it is well adapted for decolorizing uses, where a soft and light form of carbon is desirable.

According to the present invention we prepare a hard and dense active carbon of the absorptive type by the impregnation method. We have found that where any dense forms of cellulose are impregnated with certain chemical substances which are capable of exerting a powerful dehydrating action at elevated temperatures, the resulting carbon has the desirable qualities of the steam-activated product prepared from similar dense materials. On the other hand the process of making such active carbons, when carried out according to this invention, presents certain very advantageous features, as will hereinafter appear. We will describe our invention by reference to certain preferred embodiments thereof; but it is to be clearly understood that the invention is not limited to the precise procedures thus described, for many changes and alterations may be made therein without departing from the invention. Thus for instance, although we prefer to apply the heat by the electric resistance method as described below, it may be applied wholly or in part in other ways; and for certain purposes non-electrical heating methods are more desirable. Also, while we prefer to subject the materials to considerable pressures while the heat is applied, our invention is not limited to this particular procedure. Further, while the best results are obtained by operating in two stages, in such manner that the dehydrating effect of the chemical impregnating agents is brought into play in advance of the selective oxidizing action of steam or other oxidizing gas, we do not restrict our invention to this procedure; and in fact in certain cases we prefer to apply the dehydrating and oxidizing effects simultaneously rather than successively, or to dispense with a separate oxidation treatment.

In one embodiment of the invention ground cocoanut shell is impregnated with the dehydrating agent, which is preferably either zinc chloride or phosphoric acid. A suitable proportion of the dehydrating agent is usually between 25% and 200% by weight of the cellulosic material treated. Fifty per cent of phosphoric acid or 100% of zinc chloride has given very satisfactory results. When the electric resistance method of heating is to be used, it is desirable that the impregnated material shall be sufficiently saturated so that the dehydrating agent coats the surfaces of the particles and establishes a conductive path throughout the mass, and preheating by non-electrical means may be used to bring the material into a suitably conductive condition. In order better to insure the even distribution of current throughout the cross-section of the mass, the charge is tamped firmly into position between carbon electrodes, and is preferably maintained under pressure during the heating operation. This is conveniently done by tamping the charge into a trough-like structure of refractory brick, electrodes being disposed at opposite ends, and rather heavily loading the surface of the charge by appropriate weights. Any other suitable disposition of apparatus or type of furnace may of course be used.

For the best results as regards the activity and mechanical strength of the resulting carbon, it is desirable that it should be heated to temperatures in excess of 600° C. However, both zinc chloride and phosphoric acid are unstable at such temperatures in presence of carbon, and more moderate temperatures are preferably used while the impregnating agent is present, especially when furnaces of the open type are used. We have used temperatures as low as 350° C. with phosphoric acid. The charge is then cooled, leached to recover the impregnating agent, and may be further treated in any one of several ways, for example:

(a) By direct firing in a closed furnace to 600° C. or upward;

(b) By heating to 600° C. or preferably to decidedly higher temperatures in the presence of steam or other oxidizing gas, as in the steam-activation process.

In either case a very hard, dense, mechanically strong and highly active carbon is obtained.

A modification of the method consists in impregnating the cellulosic material with the dehydrating agent, charging into a tubular or other type of furnace, and heating either electrically or otherwise, under oxidizing conditions, preferably in a current of steam, or of steam and nitrogen. Under these conditions, which may be regarded as a combination of the dehydration and oxidation methods simultaneously applied, highly active products are obtained. We have observed that when steam and nitrogen are thus passed over highly heated carbon impregnated with zinc chloride, ammonia is found in the exit gases, derived probably from the direct union of nitrogen and nascent hydrogen in presence of the highly active carbon. Our invention contemplates the scrubbing of the exit gases for the recovery of this ammonia.

When phosphoric acid is used as the impregnating agent, and the material is calcined at 600° C. or above, difficulty may be experienced due to the formation and volatilization of phosphorus which may cause trouble by depositing in the exit flues. If, however, steam is introduced during the calcination period, gaseous phosphine is formed and may be conducted away and burned to phosphorus oxides which may be collected in a water scrubber and concentrated to regenerate phosphoric acid for use in the process. Instead of steam, air may be passed through the heated mass to oxidize the phosphorus, the oxide being volatilized, collected, and converted into the acid. Under these conditions there is only a small loss of carbon through oxidation, the phosphorus compounds apparently coating the carbon and excluding the air therefrom,—an action which has already been utilized in fireproofing with phosphorus compounds. When the dehydrating agent employed is zinc chloride, vapor thereof evolved during heating, if considerable in quantity, should of course be recovered.

While we have referred to the preferred impregnating chemicals, zinc chloride and phosphoric acid, as dehydrating agents, we do not intend thereby to imply that their principal or sole function in the process is to dehydrate the carbonaceous material, or otherwise to restrict ourselves to any theory as to the manner in which the activation of the carbonaceous material is brought about. Accordingly the term "dehydrating agent" is to be regarded as defining broadly the class of chemicals, typified by zinc chloride and phosphoric acid, which has been found effective to bring about the activating effect. Other substances which may be used, although less desirably, are boric acid, sodium carbonate, calcium chloride and lime.

While we prefer to operate on dense charcoals or on materials which have the inherent property of giving dense chars on simple calcination, the application of pressure during calcination, as described above, makes it possible to produce dense carbons of the gas-absorbent type from materials which are less dense and more abundant, such as wood of medium or low density. Compression during heating is also a useful expedient where the raw material is of high density but is in such a finely divided state that the calcination residue produced therefrom would otherwise be too porous to be adapted for gas-absorption processes. Where the raw material is in finely divided form it is often desirable to briquet it before heating, and preferably after impregnation. The briquetted material is then subjected to any of the described modifications of the invention, with or without the application of pressure during the heating.

Certain fruit pits, for example peach pits, have a hard and strong envelope of dense cellulosic material similar in nature to the shell of cocoanuts. The invention is applicable to all such materials and they are intended to be included by the term "nut cellulose" as used in the claims.

As has already been stated the invention, like the steam-activation process, produces dense, strong charcoals of the absorptive type. As compared with the steam-activation process the invention gives considerably increased yields because the necessity for oxidizing away a large proportion of the raw material is to a large degree avoided.

We claim:

1. Process of making dense strong activated charcoal comprising impregnating nut cellulose with a dehydrating agent, heating the mixture to a temperature not materially below 350° C., leaching out the soluble components, and reheating the resulting carbon in an oxidizing atmosphere.

2. Process of making dense strong activated charcoal comprising impregnating nut cellulose with a dehydrating agent, heating the mixture to a temperature not materially below 350° C., leaching out the soluble components, and reheating the resulting carbon in an atmosphere comprising steam.

3. Process of making dense strong activated charcoal comprising impregnating nut cellulose with a dehydrating agent, heating the mixture to a temperature not materially below 350° C., leaching out the soluble components, and reheating the resulting carbon in an atmosphere comprising steam and nitrogen.

4. Process of making dense strong activated charcoal comprising impregnating nut cellulose with phosphoric acid, heating the mixture to a temperature not materially below 350° C., and preventing the separation of elemental phosphorus by passing to the heating zone a gas reactive with phosphorus.

5. Process of making dense strong activated charcoal comprising impregnating nut cellulose with phosphoric acid, heating the mixture to a temperature not materially below 350° C., and passing steam to the heating zone to prevent the separation of elemental phosphorus.

6. Process of making dense strong activated charcoal comprising impregnating nut cellulose with phosphoric acid, heating the mixture to a temperature not materially below 350° C., passing steam over the heated material to carry off volatile phosphorus compounds, recovering phosphorus compounds from the steam and returning the phosphorus compounds to the process.

7. Process of making dense strong activated charcoal comprising impregnating nut cellulose with a dehydrating agent, heating the mixture to a temperature not materially below 350° C., while strongly compressing the same, and leaching out the soluble components.

8. Process of making dense strong activated charcoal comprising impregnating nut cellulose with a dehydrating agent, electrically heating the mixture to a temperature not materially below 350° C. while strongly compressing the same, and leaching out the soluble components.

9. Process of making dense strong activated charcoal comprising impregnating finely divided nut cellulose with a dehydrating agent, heating the mixture to a temperature not materially below 350° C. while strongly compressing the same, and leaching out the soluble components.

10. Process of making dense strong activated charcoal comprising impregnating cellulosic material with a dehydrating agent, heating the mixture to a temperature not materially below 350° C. while strongly compressing the same, and leaching out the soluble components.

11. Process of making dense strong activated charcoal comprising impregnating cellulosic material with a dehydrating agent, electrically heating the mixture to a temperature not materially below 350° C. while strongly compressing the same, and leaching out the soluble components.

12. Process of making dense strong activated charcoal comprising impregnating finely divided cellulosic material therefrom with a dehydrating agent, heating the mixture to a temperature not materially below 350° C. while strongly compressing the same, and leaching out the soluble components.

13. Process of making dense strong activated charcoal comprising impregnating finely divided cellulosic material or finely divided charcoal with a dehydrating agent, briquetting the mixture and heating it to a temperature not materially below 350° C., leaching out the soluble components and reheating the resulting carbon to a higher temperature in an oxidizing atmosphere.

In testimony whereof, we affix our signatures.

ARTHUR BENNING RAY.
ERNEST GARDNER DOYING.
JOHN J. BUTKOVSKY.